United States Patent [19]

Schuermann

[11] 4,159,630
[45] Jul. 3, 1979

[54] ASSEMBLY SUCH AS FOR A TILE CHUTE TOOL FOR USE WITH A DITCHING OR TRENCHING MACHINE

[75] Inventor: Kenneth W. Schuermann, Perry, Okla.

[73] Assignee: The Charles Machine Works, Inc., Perry, Okla.

[21] Appl. No.: 821,308

[22] Filed: Aug. 2, 1977

[51] Int. Cl.² ............................................. F16L 1/02
[52] U.S. Cl. ..................................................... 405/174
[58] Field of Search ...................... 61/72.5, 72.6, 105; 214/1 PA

[56] References Cited

U.S. PATENT DOCUMENTS

| | | | |
|---|---|---|---|
| 3,286,476 | 11/1966 | Maclay | 61/72.6 |
| 3,292,379 | 12/1966 | McElvany | 61/72.5 |
| 3,605,419 | 9/1971 | Wells | 61/72.5 |
| 4,043,135 | 8/1977 | Hoes et al. | 61/72.5 |

Primary Examiner—Mervin Stein
Assistant Examiner—David H. Corbin
Attorney, Agent, or Firm—Schuyler, Birch, Swindler, McKie & Beckett

[57] ABSTRACT

An assembly such as for a tile chute tool for laying tile, plastic pipe or the like or for a crumbing tool either of which tools is adapted to be connected to the digging boom and mobile chassis of a ditching or trenching machine by a four-bar linkage. The linkage is connected to the boom by extensible arm means which can be fixed at one length to maintain the boom and tile chute tool in operable relation to each other for digging and tile laying or other tool function, or released to be telescopically extendible for the digging boom to proceed with digging with the tile chute tool remaining at ground level. A control member tiltable relative to the pivot axis of the digging boom connects to the linkage to alter the position of the tile chute tool bottom.

4 Claims, 3 Drawing Figures

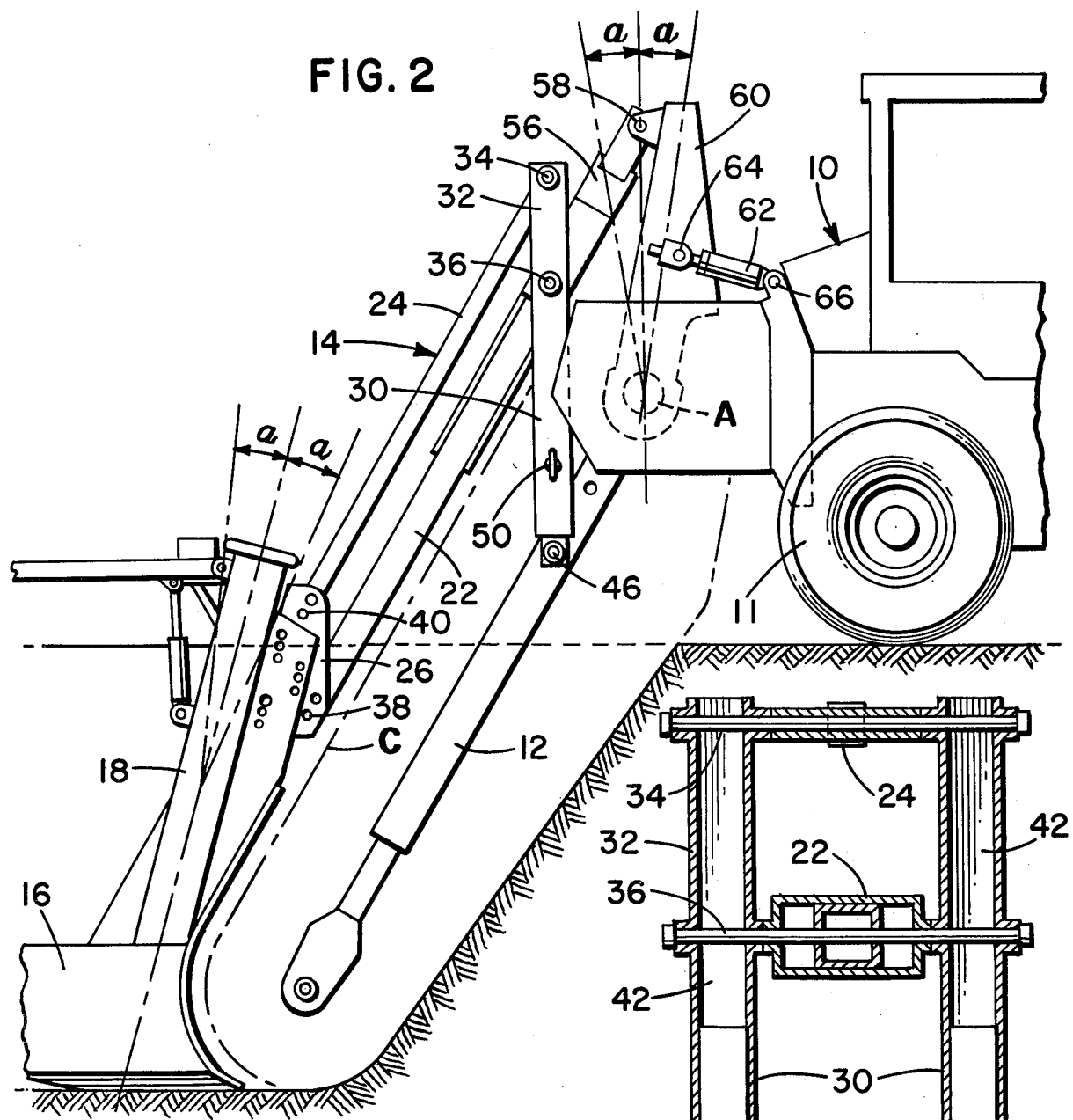

ASSEMBLY SUCH AS FOR A TILE CHUTE TOOL FOR USE WITH A DITCHING OR TRENCHING MACHINE

FIELD OF THE INVENTION

This invention relates to assemblies such as for tile chute or crumbing tools to be attached to the digging boom and mobile chassis of a ditching or trenching machine. For clarity and simplicity in description, the invention will be specifically described in relation to a tile chute assembly which is used with a ditcher or trencher to perform the function of feeding tile, plastic pipe or the other tubular material into the trench being dug by the trencher or ditcher.

BACKGROUND OF THE INVENTION

The prior art has presented certain problems in associating a tool such as a tile chute with the digging boom of the trencher. The tool is normally related to the digging boom such that a long distance of trench must be completed before the attached tile chute can reach its full depth to commence supplying tile, plastic pipe, etc. into the trench.

Likewise in positioning the tile chute tool relative to the bottom of the trench, mechanism such as cams, slides, rollers, springs, etc. have been heretofore proposed, these devices are sensitive to keeping them free of dirt and mud and rely heavily on the experience and skill of the operator. Under the best of conditions, it has been difficult to known with assurance that the tile chute tool is performing properly.

The invention herein is deemed to overcome these problems by presenting a relatively simply device which pemits the tile chute to remain at ground level while the digging boom proceeds to initiate, through the action of the digging chain, formation of the ditch and enables the tile chute to follow down into the ditch after only a short distance of digging whereupon the assembly carrying the tile chute tool can be fixed in relation to the boom for continued operation in the laying of tile, plastic pipe, etc.

SUMMARY OF THE INVENTION

Generally the invention comprises an assembly such as for a tile chute tool for laying tile, plastic pipe or the like. The assembly is adapted to be connected to the digging boom and mobile chassis of a ditching or trenching machine by a four-bar linkage. This linkage is connected to the boom by one or more telescopic arms which can be fixed at one length to maintain the boom and tile chute tool in operable relation to each other for digging and tile laying or other tool function. On the other hand, this telescopic arm or arms may be released to be telescopically extendible for the digging boom to proceed with the digging operation of the digging chain while the tile chute tool remains at ground level.

BRIEF DESCRIPTION OF THE DRAWINGS

FIG. 2 is a side elevational view showing the relationship of the tile chute assembly and digging boom in full operation.

FIG. 3 is a sectional view taken on line 3—3 of FIG. 1.

Referring to FIG. 1, the mobile chassis 10 of a ditching or trenching machine is partially shown. It will be seen in FIG. 1 that the chassis of the machine is rendered mobile by being supported on driven wheels 11 (only one of which is shown) or other means may be used to support the chassis to move it along in carrying out the trenching operation. The digging boom 12 of this machine is mounted to be supported on the rear of this chassis to be pivotable about axis A from the ground level position shown in FIG. 1. As the digging chain C, represented by the broken lines and which is carried by boom 12, is driven by the machine the chain digs downwardly into the earth moving in the direction and to the position depicted by the phantom showing of the boom in FIG. 1. FIG. 2 illustrates this same digging condition or position of the boom 12. It is not believed the details of the digging boom or support of the chain C on such boom and the driving mechanism for such chain need be described or shown in detail since these features are well known in the ditching and trenching art.

The assembly carrying the tile chute tool is generally shown at 14. The tile chute tool or boot 16 has a feed tube 18 through which the tile, plastic pipe or the like is supplied down to the tool or boot. In FIG. 1, both the boom and the tile chute assembly are shown associated with each other at ground level. In FIG. 2 the relationship between these components is shown in their operating condition with the boom and digging chain operative thereon producing the trench followed by the tile chute tool or boot 16 to feed the tile, plastic pipe or the like into the trench formed by the digging chain on boom 12.

Figure 1:
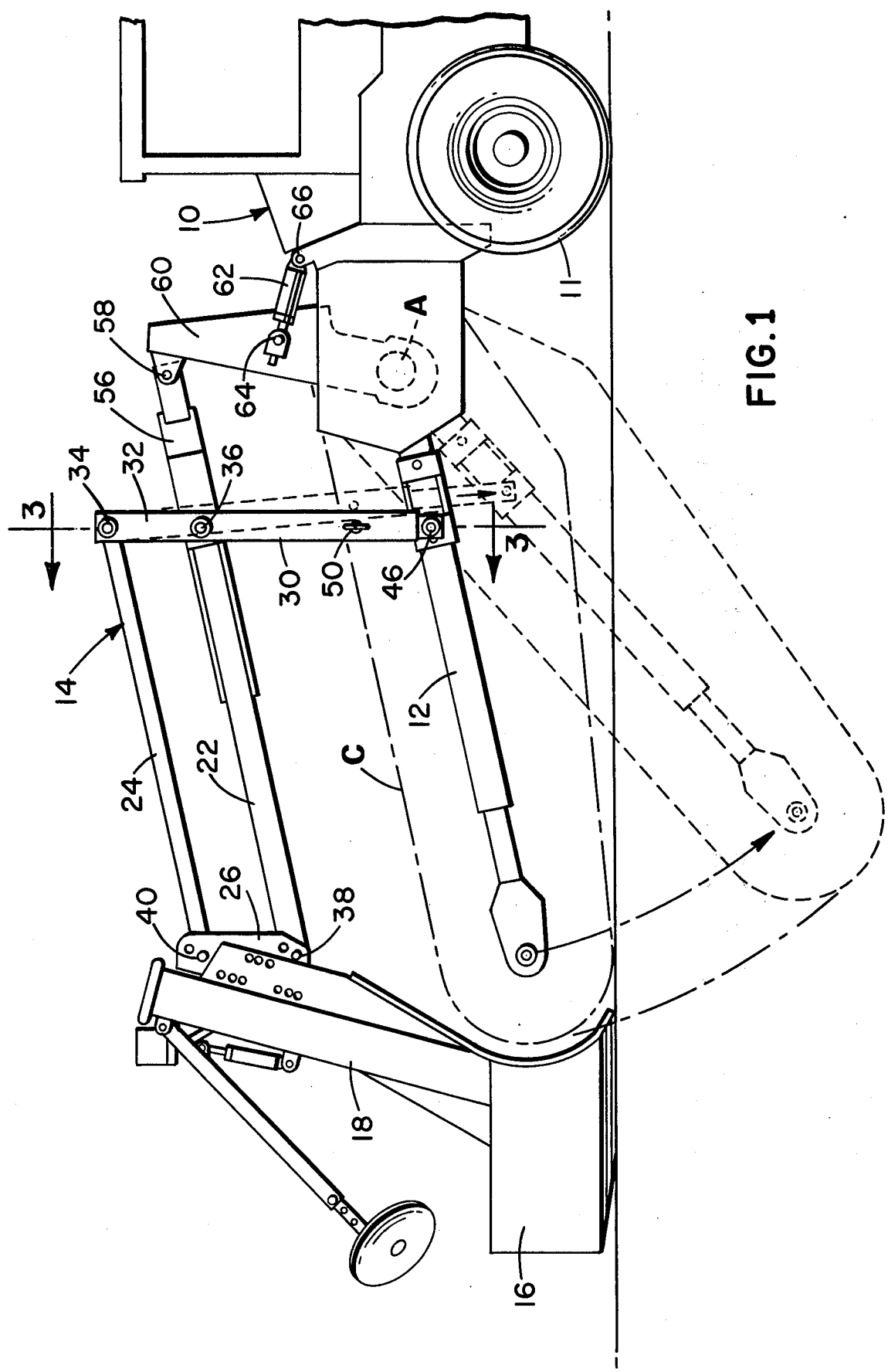
FIG. 1 is a side elevational view showing the digging boom and tile chute tool carrying assembly operatively positioned and the boom in phantom as it commences digging when the restraint of the telescopic arm is removed leaving the tile chute assembly at ground level.

The tile chute tool and its feed tube 18 are carried on the assembly 14 by a four-bar linkage in the form of a parallelogram. The linkage consists of a main load carrying member 22, a tie link member 24 parallel to member 22 and end member 26 to which the tile chute tool is rigidly secured so that movements of the tool are controlled by the four-bar linkage. A pair of telescoping arms 30 each have a portion of its length 32 forming the fourth member of the four-bar linkage.

The elements 22, 24, 26 and portions 32 of arms 30 are pivotally connected together at their ends at 34, 36, 38 and 40. The telescoping arm 30 on each side of the link elements 22 and 24, as best shown in FIG. 3, is made up of two telescoping members 42 and 44. The pin connection of the portion of these arms which form one of the link elements for the parallelogram at 36 and 34 are shown on FIG. 3 as well as FIG. 1. The arms 30 are of similar construction and pass on opposite sides of the link elements 22 and 24 and on opposite sides of the boom 12. The lower ends of arms 30 are connected by pin 46 to boom 12 so that when these arms are restrained against extension or retraction the four-bar linkage of the tile chute tool carrying assembly is constrained to move with the movement of digging boom 12 as it pivots about axis A on the machine in going into a digging operation. Without such restraint the arms 30 are free to telescopically extend or retract leaving the boom 12 free to commence a digging operation while the tile chute assembly may rest and remain on the ground level until a sufficient length of trench has been produced whereupon the mobile chassis of the trencher moves forward to let the tile chute assembly lower the tile chute tool 16 down into the freshly dug trench.

To retain the length of the arms 30 at a desired fixed length for the boom and linkage carrying the tile chute tool to be maintained in a predetermined operating relationship, removable pins 50 areprovided, one for each arm 30. To accommodate a pin, the members 42 and 44 which are telescopically engaged with each other are provided with openings that mate or align at a predetermined relative position of these members 42 and 44. At this point of mating the pins 50 may be inserted. Both of the arms 30 as shown in FIG. 3 are similar in this respect.

Each pin 50 may appropriately have a loop handle 52 to be grasped in assisting the removal of the pin. Likewise a suitable spring retainer 54 may be provided to engage with a groove on the pin and releasably hold the pin in place against accidental or inadvertent removal while the equipment is in operation. Of course the clip 54 only retains against accidental removal or jarring of the pin from its retaining position and still permits the pin to be extracted by grasping the loop handle 52 on the pin. Of course other retaining means or clamping means to fix the length of the arms 30 may be employed as desired when fixation of this length in operation is in order.

The four-bar linkage has the main link member 22 extending beyond and between the parallel extensible arms 30 that connect the linkage to the digging boom 12 by means of pin 46. This extension 56 has a pin connection 58 connecting it to an upright lever 60. The lever 60 is mounted relative to the mobile chassis of the trenching machine to be swingable around axis A which is the same axis on which the boom 12 pivots. Lever 60 may be controlled by an extensible hydraulic actuator 62 pin connected at 64 to lever 60 and pin connected at 66 to a point stationary relative to the mobile chassis 10 of the trenching machine.

When cylinder 62 is retracted, lever 60 swings forward about point A and arms 30 pivot about their connection at pin 46 to the boom 12. All members of the system remain parallel but the intersecting angles between members change. The effect of this is that the bottom of the tile chute tool or boot 16 remains at right angles to arms 30, but the tool 16 is now inclined with the toe being lower than the heel of the tool or boot 16. Likewise when cylinder 62 is extended the bottom of the tile chute tool or boot 16 still stays at right angles to arms 30 but now the heel moves to a point lower than the toe.

This cylinder 62 can be placed in a "float" mode which allows the bottom of the tile chute tool or boot 16 to ride on the ditch bottom and retain its attitude as the machine traverses uneven ground.

Referring back to the operation and functioning of the extensible arms 30 which may be retained at a fixed length by pins 50 in some modes of operation such arms are released by removing pins 50 to permit telescopic extension of arms 30. The particular utility of this structure may be explained as follows. When starting a ditch or trench, it is sometimes necessary to reach a given depth with very little forward movement of the machine. With the instant invention, arms 30, being extensible by the telescoping relationship of their parts, normally have the locking pins 50 in place during grade control operations. However, when starting a ditch in a short distance is necessary, these pins can be removed. Thereupon the four-bar linkage is no longer locked to the digging boom 12 by arms 30. Therefore, the digging boom 12 can be lowered by the digging action of chain C to the desired depth with arms 30 elongating telescopically and tile chute tool 16 remaining at ground level. After the digging depth has been obtained, through the action of digging chain C carried by boom 12, the machine moves and digs forward until the tile chute 16 moves down into the open trench whereupon arms 30 retract to their original position. When the tile chute tool or boot 16 is on the trench bottom, the holes in the members 42 and 44 of each arm 30 will be mated up or aligned and the pins 50 are thereupon reinstalled. In this situation, the four-bar linkage is again locked to the digging boom for controlled grade digging operations.

It will be understood that variations and modifications from the above-described preferred embodiment are to be contemplated and may become recognized to those skilled in the art once having viewed this disclosure. However, the scope of the invention is not to be considered limited by this disclosure but is instead governed by the breadth of the appended claims.

I claim:

1. An assembly such as for a tile chute tool to be attached to the digging boom and mobile chassis of a ditching or trenching machine comprising:

a four-bar linkage in the form of a parallelogram having an element such as a tile chute tool carried by one of the members of said linkage, means for pivotally connecting said linkage to the mobile chassis of the machine, said connecting means extending from said linkage for attachment to a tiltable control lever supported relative to the mobile chassis of the ditching or trenching machine, extensible means for pivotally connecting said linkage to the digging boom, said extensible means including a pair of parallel telescoping arms, two of the members of said four-bar linkage extending between said arms and being pivotally connected to said arms at spaced positions defining a portion along the length of each of said pair of arms which portion forms another member of said linkage, said two of the members being pivotally connected at spaced positions on the linkage member carrying said element, and releasable means associated with said extensible means to retain it at a fixed length against extending movement to retain the boom and said linkage in a predetermined operating relationship to each other but being releasable to permit the boom to proceed with digging independent of the assembly position.

2. An assembly such as for a tile chute tool to be attached to the digging boom and mobile chassis of a ditching or trenching machine comprising:

a four-bar linkage in the form of a parallelogram having an element such as a tile chute tool carried by one of the members of said linkage, connecting means associated with said linkage for pivotal attachment of the assembly to the mobile chassis of the ditching or trenching machine, extensible means pivotally connected to said linkage and having means for pivotally connecting said extensible means to the digging boom, and releasable means carried by said extensible means to retain said extensible means at a predetermined fixed length against extending or contracting movement to retain the boom and said linkage in a predetermined fixed operating relationship to each other but being releasable to thereupon permit the boom to proceed with digging independent of the assembly position.

3. An assembly as recited in claim 2 wherein said extensible means includes at least one telescoping arm comprising relatively slidable cooperating members and removable pin means is provided to engage mating openings in said cooperating members to maintain them at a fixed length against telescoping movement.

4. An assembly as recited in claim 2 wherein said extensible means has a portion thereof forming another of the members of said four-bar linkage, two other members of said four-bar linkage being pivotally connected to said portion of said extensible means at spaced positions, and said two other members being pivotally connected at spaced positions to said one of the linkage members carrying said element.

* * * * *